United States Patent [19]

Geary, Jr.

[11] 4,349,291

[45] Sep. 14, 1982

[54] APPARATUS FOR SECURING A WHEEL TO A ROTATABLE SHAFT OF A TURBOMACHINE

[75] Inventor: Carl H. Geary, Jr., Greensburg, Pa.

[73] Assignee: Carrier Corporation, Syracuse, N.Y.

[21] Appl. No.: 257,295

[22] Filed: Apr. 24, 1981

Related U.S. Application Data

[62] Division of Ser. No. 955,428, Oct. 27, 1978, Pat. No. 4,293,996.

[51] Int. Cl.³ .............................................. B63H 1/20
[52] U.S. Cl. ................................ 403/15; 416/244 A; 403/31
[58] Field of Search ............... 29/252, 446, 526 R; 403/151, 31; 416/244 R, 244 A, 244 B

[56] References Cited

U.S. PATENT DOCUMENTS

| | | | |
|---|---|---|---|
| 1,959,901 | 5/1934 | Buehle | 403/15 |
| 2,571,265 | 10/1951 | Leufven | 29/446 UX |
| 3,267,568 | 8/1966 | Johnson et al. | 29/446 UX |
| 3,462,180 | 8/1969 | Bunyan | 403/31 X |
| 3,469,556 | 9/1969 | Campbell et al. | 416/244 B UX |
| 3,549,275 | 12/1970 | Laskey | 416/244 B X |
| 3,698,836 | 10/1972 | Herbage | 416/244 B X |
| 3,772,759 | 11/1973 | Bunyan | 29/252 |
| 3,819,286 | 6/1974 | Bianchi | 403/31 |
| 3,898,010 | 8/1975 | Jungbluth | 403/15 |
| 3,916,495 | 11/1975 | Klassen et al. | 416/244 A X |

*Primary Examiner*—Charlie T. Moon
*Attorney, Agent, or Firm*—J. Raymond Curtin; John S. Sensny

[57] ABSTRACT

A wheel of a turbomachine is secured to a shaft of the machine by initially securing the wheel between one end of the shaft and a piston-like member. A space is formed between opposed sides of the member and wheel by moving the member relative to the wheel. A spacing member is placed in the space for placing a compressive force on the wheel for positively securing the wheel to the shaft.

7 Claims, 1 Drawing Figure

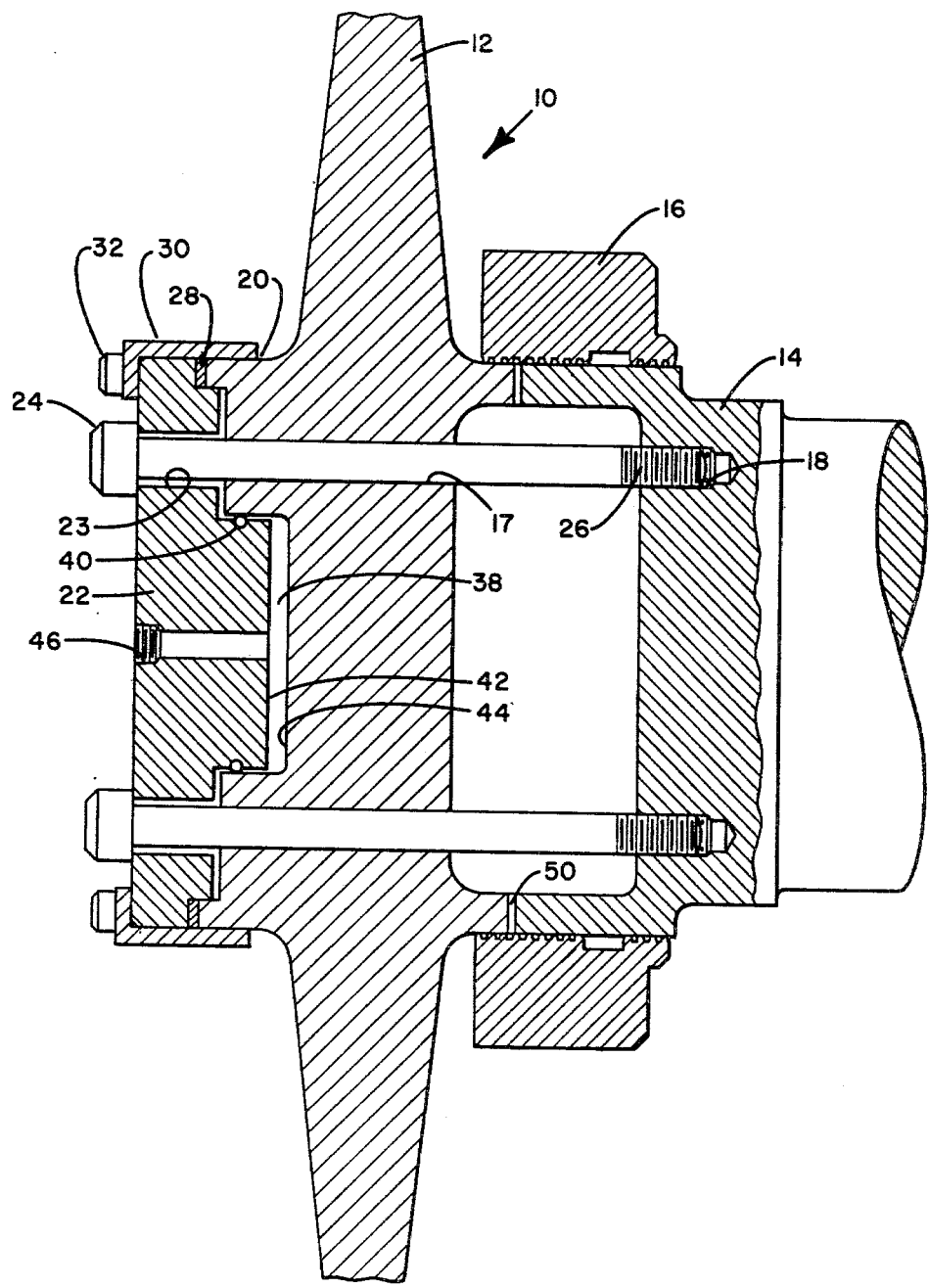

APPARATUS FOR SECURING A WHEEL TO A ROTATABLE SHAFT OF A TURBOMACHINE

This application is a division of application Ser. No. 955,428, filed Oct. 27, 1978, now U.S. Pat. No. 4,293,996 issued Oct. 13, 1981.

BACKGROUND OF THE INVENTION

This invention relates to apparatus for securing a wheel member of a turbomachine to a rotatable shaft, and in particular to an arrangement which positively secures the wheel to the shaft without generating torsional forces.

Rotors of turbomachinery, such as centrifugal compressors and axial flow compressors and turbines, are at times manufactured as a composite structure, wherein the discs or wheels of the turbomachine are attached to stub shafts, which are fixed to the ends of a thru-bolt, sometimes referred to as a tie-bolt. In achieving the composite structure, heat has been applied to the thru-bolts for developing forces to positively secure the wheels to the shafts. In order to apply the heat, holes have been drilled through the entire length of the shafts, destroying the integrity of the shafts and increasing the problems associated with achieving dynamic and static balance of the rotor. In addition, alignment of the shaft journals has been difficult to achieve without complicated and relatively expensive manufacturing techniques. It has been suggested that the heating step used to positively secure the wheels to the shafts be eliminated, and that compression and torsional forces developed through the use of appropriate bolt and nut arrangements be used to achieve the desired joining of the disc and shaft.

However, turbomachinery employed in many applications, such as power recovery installations, operate at relatively high temperatures. Thus, the working strength of the various elements of the turbomachine are reduced as the working strength of a metallic component generally varies inversely to the temperature of the environment in which the component operates. The torsional forces developed in securing the disc to the shaft will generate torsional stresses. Such stresses may result in the failure of one or more of the bolts due to the relatively low value of the working strength of the bolts. Generally speaking, the shear strength of the bolts to withstand the torsional stresses is approximately one-half the tensile strength of the bolts at any given temperature. As is obvious, a failure of a connecting bolt may result in major damage to the turbomachine.

SUMMARY OF THE INVENTION

Accordingly, it is an object of this invention to eliminate torsional stresses developed in the means employed to secure a wheel to a shaft of a turbomachine rotor.

It is a further object of this invention to utilize tensile and compressive forces to secure the wheel to the shaft.

It is a further object of this invention to positively secure a wheel to a shaft without creating torsional stresses.

It is yet another object of this invention to provide a wheel secured to a shaft suitable for use in high temperature environments.

It is yet another object of this invention to secure and accurately attach the wheel to a shaft through a relatively inexpensive arrangement.

These and other objects of the present invention are attained in an apparatus for securing a wheel to a rotatable shaft which includes the utilization of bolt means for connecting the wheel to an end of the shaft. Means are connected to the bolt means for generating a hydraulic force for stretching the bolts. A compressive force is developed on the disc subsequent to the stretching of the bolts for positively securing the wheel to the shaft.

BRIEF DESCRIPTION OF THE DRAWING

The single FIGURE of the drawing illustrates a sectional view of a portion of a turbomachine embodying the present invention.

DESCRIPTION OF THE PREFERRED EMBODIMENT

Referring now to the drawing, there is disclosed a preferred embodiment of the present invention. In particular, there is disclosed a portion of a turbomachine 10 comprising a wheel member such as disc 12 attached to rotate with a shaft 14, the disc and shaft forming in combination the rotor section of the turbomachine. Suitable axially extending seals, as for example labyrinth seals 16 are provided about shaft 14 to maintain leakage of the motivating fluid to a minimum. Shaft 14 is formed with a plurality of tapped holes 18, each of the tapped holes receiving therein a threaded end 26 of a bolt 24. Disc 12 includes a plurality of drilled holes or apertures 17, provided in axial alignment with threaded holes 18. Suitable torque transmitting means, such as coupling 50 join disc 12 to shaft 14 resulting in the joint rotation of the shaft and disc.

Turbomachine 10 may be a centrifugal compressor, an axial compressor, a radial or axial turbine. Wheel member 12 takes the form of an impeller when machine 10 is a centrifugal compressor and takes the form of a bladed disc when the machine is an axial compressor or turbine.

A piston-like or outside member 22 is located axially outside wheel 12 and is supported by the wheel for axial movement relative thereto, and surfaces of the wheel and outside member 22 define an expansible chamber 38. Expansible chamber 38, more particularly, is bounded or defined by first and second opposite radial surfaces of wheel 12 and outside member 22 respectively, and first and second opposite annular surfaces of the wheel and the outside member respectively. Preferably, as shown in the drawing, the above-mentioned first annular surface is radially outside the second annular surface. The piston also includes a plurality of holes or apertures 23 provided in axial alignment with holes 17 and 18 respectively provided in wheel 12 and shaft 14. Bolts 24 thus extend axially through the piston-like member, the rotor disc, and terminate in the threaded hole formed in shaft 14; and preferably, it should be noted, bolts 24 are radially located outside expansible chamber 38.

Piston-like member 22 further includes a fluid opening 46. Opening 46 connects with a suitable conduit (not shown) to provide a high pressure fluid from a source thereof (not shown) to chamber 38. A suitable seal such as O-ring 40 is provided to prevent leakage of the high pressure fluid from chambe 38. Specifically, O-ring 40 is located between and engages the above-mentioned first and second annular surfaces of wheel 12 and piston-like or outside member 22.

When wheel member 12 is positively secured to shaft 14, as for example when the rotor section is installed in the turbomachine's casing, the rotor includes annular shim member 28, provided between opposed sides 42 and 44 respectively of piston-member 22 and wheel member 12. The diameter of the shim member is equal to or less than the diameter of the piston-like member. A shim cover plate 30 is suitably attached, as for example by screws 32 to piston-like member 22.

As noted previously, it is desirable to minimize torsional stresses generated in the bolts used to secure the wheel to the shaft. The minimization or elimination of torsional stresses is particularly important in turbomachines utilized with relatively high temperature motivating fluids.

In securing piston-like member 22, wheel 12 and shaft 14 to form the rotor section of turbomachine 10, bolts 24 are initially placed through aligned holes 17, 18 and 23. The bolts are only lightly torqued to maintain the initial integrity of the rotor section. Ends 26 of bolts 24 are securely anchored within holes 18 of shaft 14 due to the mating engagement of the threaded sections. Shims 28 are not placed within the assembly at this time; opposed sides 42 and 44 are in direct contact with each other. High pressure hydraulic fluid is thence delivered to chamber 38 through connection 46. The fluid generates a force in the chamber to move piston-like member 22 relative to wheel 12 to expand the volumetric size of chamber 38. The movement of piston 22 results in the stretching of bolts 24 attached thereto and the compression of wheel 12. A shim space is formed between the opposed sides of the wheel and piston with shim 28 being placed in the shim space. Shim 28 is in direct contact with the opposed sides of piston 22 and wheel 12. Shim cover plate 30 is then attached to piston 22. After the bolts 24 have been stretched to their desired length, the fluid is exhausted from chamber 38.

By stretching bolts 24, the bolts are placed in tension. The tensile force thus developed is transmitted through piston member 22 and shim 28 as a compressive force acting against wheel 12 to maintain the wheel positively secured to shaft 14. Essentially, the only force acting on bolts 24 is the tensile force developed during the stretching of the bolts. Thus, the working strength of the bolts will not be decreased as a result of the generation of torsional forces and thus stresses acting thereon.

When it is desired to remove the wheel from the shaft, hydraulic fluid is reintroduced into chamber 38 to again stretch bolts 24 to eliminate the compressive force acting on wheel 12. The arrangement and method disclosed herein provides a relatively inexpensive means for positively securing the wheel of a turbomachine to a shaft. The arrangement finds particular applicability in turbomachines having a relatively high temperature working fluid flowing therethrough, where it is particularly important that torsional stresses be maintained at a minimum to prevent material fatigue.

While a preferred embodiment of the invention has been described and illustrated, the invention should not be limited thereto but may be otherwise embodied within the scope of the following claims.

What is claimed is:

1. Apparatus for securing a wheel to a rotatable shaft of a turbomachine comprising:
    an outside member disposed axially outside the wheel, wherein surfaces of the wheel and the outside member define an expansible chamber;
    a plurality of connecting means axially extending through aligned apertures defined by the shaft, the wheel, and the outside member, with a first end of the connecting means secured to the shaft and a second end of the connecting means engaging the outside member;
    means for generating a force within the expansible chamber to move the outside member relative to the wheel to apply a stretching force to the connecting means and a compressive force to the wheel, axially compressing the wheel against the shaft; and
    means for maintaining the stretching force on the connecting means and the compressive force on the wheel to allow removal of the force generating means.

2. Apparatus in accordance with claim 1 wherein:
    the expansible chamber is defined by
    a first radial surface defined by the wheel,
    a second radial surface defined by the outside member opposite to the first radial surface,
    a first annular surface defined by the wheel,
    a second annular surface defined by the outside member opposite to the first annular surface; and
    further including a seal located between and engaging the first and second annular surfaces to prevent fluid leakage from the expansible chamber.

3. Apparatus in accordance with claim 2 wherein the connecting means are located radially outside the expansible chamber.

4. Apparatus in accordance with claim 3 wherein the first annular surface is radially outside the second annular surface.

5. Apparatus in accordance with claim 1 wherein:
    the force generating means moves apart surfaces of the outside member and the wheel radially outside the expansible chamber to define an axial shim space between the wheel and the outside member; and
    the maintaining means includes shim means positioned within the shim space and in contact with opposed surfaces of the outside member and the wheel for maintaining the compressive force on the wheel to secure the wheel positively to the shaft.

6. Apparatus in accordance with claim 5 further including a shim cover plate secured to the outside member and extending over the shim means to maintain the shim means in the shim space.

7. Apparatus in accordance with claim 6 wherein:
    the connecting means includes a plurality of bolts;
    first ends of the bolts are anchored within the shaft; and
    second ends of the bolts define bolt heads axially located outside and abutting against the outside member.

* * * * *